(12) United States Patent
Tello

(10) Patent No.: US 7,755,973 B2
(45) Date of Patent: Jul. 13, 2010

(54) ULTRASONIC LOGGING METHODS AND APPARATUS FOR AUTOMATICALLY CALIBRATING MEASURES OF ACOUSTIC IMPEDANCE OF CEMENT AND OTHER MATERIALS BEHIND CASING

(75) Inventor: Lucio N. Tello, Benbrook, TX (US)

(73) Assignee: Precision Energy Services, Inc., Ft. Worth, TX (US)

( * ) Notice: Subject to any disclaimer, the term of this patent is extended or adjusted under 35 U.S.C. 154(b) by 0 days.

(21) Appl. No.: 12/034,990

(22) Filed: Feb. 21, 2008

(65) Prior Publication Data

US 2009/0213689 A1 Aug. 27, 2009

(51) Int. Cl.
*G01V 1/40* (2006.01)
(52) U.S. Cl. .................................................. 367/35
(58) Field of Classification Search ............ 367/31, 367/35, 25; 181/102, 105
See application file for complete search history.

(56) References Cited

U.S. PATENT DOCUMENTS

| | | | | |
|---|---|---|---|---|
| 4,896,303 A | * | 1/1990 | Leslie et al. | 367/35 |
| 4,928,269 A | * | 5/1990 | Kimball et al. | 367/35 |
| 5,216,638 A | * | 6/1993 | Wright | 367/35 |
| 6,041,861 A | * | 3/2000 | Mandal et al. | 166/250.01 |
| 7,525,872 B2 | * | 4/2009 | Tang et al. | 367/35 |
| 2006/0067162 A1 | | 3/2006 | Blankenship et al. | |
| 2009/0086575 A1 | | 4/2009 | Tello et al. | |

OTHER PUBLICATIONS

Chang, "Acoustic Cement Bonding Logging Diagnostics for Geothermal Applications," Sandia National Laboratories, Jan. 1981, http://www.osti.gov/bridge/purl.cover.jsp?purl=/6309278-sw2K83/.*
Chang, "Acoustic Cement Bond Logging Diagnostics for Geothermal Applications", Sandia National Laboratories, Jan. 1981.*
Combined International Search Report and Examination Report received in corresponding application No. UK patent application GB0900436.7dated May 6, 2009.

* cited by examiner

*Primary Examiner*—Scott A Hughes
*Assistant Examiner*—Krystine Breier
(74) *Attorney, Agent, or Firm*—Wong, Cabello, Lutsch, Rutherford & Brucculeri LLP

(57) ABSTRACT

Methods and apparatus for in situ, continuous, automatic, and real-time acoustic impedance calibration of a transducer in an acoustic logging system. By taking the frequency characteristics of the ultrasonic transducer which are present in the internal casing reflection and convolving them with the frequency characteristics of the casing being logged, a theoretical model is created with a theoretical acoustic impedance fluid producing a theoretical free pipe signal at each measure point. The measured signal is then compared to the theoretical free pipe signal thereby yielding a calibrated acoustic impedance value for at each measure point. The only model employed is in the theoretical calculation of spectrum characteristics of free pipe.

10 Claims, 4 Drawing Sheets

ULTRASONIC LOGGING METHODS AND APPARATUS FOR AUTOMATICALLY CALIBRATING MEASURES OF ACOUSTIC IMPEDANCE OF CEMENT AND OTHER MATERIALS BEHIND CASING

This invention is directed toward a borehole logging system for the measure of properties and conditions of well borehole environs. More particularly, the invention is directed toward the automatic calibration of an acoustic logging system for measuring acoustic impedance of material filling an annulus formed by the outside surface of a tubular and the wall of the borehole.

BACKGROUND OF THE INVENTION

Well boreholes are typically drilled in earth formations to produce fluids from one or more of the penetrated formations. The fluids include water, and hydrocarbons such as oil and gas. Well boreholes are also drilled in earth formations to dispose waste fluids in selected formations penetrated by the borehole. The boreholes are typically lined with a tubular commonly referred to as "casing". Casing is typically steel, although other metals and composites such as fiberglass can be used. The outer surface of the casing and the borehole wall form an annulus, which is typically filled with a grouting material such as cement. The casing and cement sheath perform several functions. One function is to provide mechanical support for the borehole and thereby prevent the borehole from collapsing. Another function is to provide hydraulic isolation between formations penetrated by the borehole. The casing can also be used for other functions such as means for conveying borehole valves, packers, pumps, monitoring equipment and the like.

A variety of acoustic borehole logging systems are used to evaluate casing condition and the effectiveness of hydraulic isolation provided by cement filling the casing-borehole annulus. The Ultrasonic Radial Scanner logging system disclosed in U.S. Patent Application Publication No. US 2006/0067162 A1 is particularly effective in evaluating casing and the near borehole environs. Among other parameters, the Ultrasonic Radial Scanner tool measures the acoustic impedance of material within the casing-borehole annulus.

During a typical acoustic impedance logging operation, the logging tool is located at an axial position in the borehole where there is little or no cement is the casing-borehole annulus. This condition is commonly referred to as "free pipe". The density of drilling fluid used in drilling the well is typically known. Drilling fluid acoustic impedance can be estimated in free pipe intervals using drilling fluid density and the type of drilling fluid (e.g. oil based or water based) using empirical relationships known in the art. An estimated "acoustic impedance calibration" value is then obtained within the borehole by combining the response of the logging tool in free pipe with estimates of drilling fluid acoustic impedance.

Potential error is introduced in the above in situ acoustic impedance calibration method from several sources. As a first example, there is no assurance that the density of drilling fluid in the casing-borehole annulus is the same as the density of the drilling fluid used to drill the well. Density can change due to contamination of formation fluids, particulate material from the drilling fluid, and the like. As a second example, the type of fluid in the casing-borehole annulus can change during the drilling operation. Formation water can commingle with oil based drilling fluid, or formation water can commingle with water based drilling fluid. As a third example, the relationship between drilling fluid density and drilling fluid acoustic impedance is empirical thereby introducing another potential source of error.

There is also no assurance that an axial interval of free pipe is present in the cased borehole. This negates the use of the in situ acoustic impedance calibration discussed above. The logging system can alternately be calibrated at the surface of the earth using calibration fixtures comprising casing of known dimensions and acoustic characteristics backed by materials of known acoustic impedance properties. The calibration is erroneous if the actual well casing does not match, in dimensions and acoustic properties, the casing of the surface calibration fixture. Furthermore the calibration is erroneous if the fluid within the casing-borehole annulus (which is typically unknown) does not match the acoustic properties of the material backing the casing in the surface calibration fixture.

Borehole environments are typically harsh in temperature, pressure and ruggosity, and can adversely affect acoustic transducer response. More specifically, acoustic measures of the borehole parameters of interest can be adversely affected by harsh borehole conditions. Changes in borehole temperature and pressure are typically not predictable. Acoustic impedance calibration within an axial interval of free pipe, or calibration in surface calibration fixtures, are not valid under continuously changing conditions encountered as the logging tool is conveyed along the well borehole.

In view of the above discussion, it is apparent that apparatus and methods for automatic, continuous and real-time calibrating a transducer of an acoustic logging system would yield more accurate measures of various properties of the borehole environs.

SUMMARY OF THE INVENTION

This present invention is directed toward methods and apparatus for in situ, continuous, automatic, and real-time acoustic impedance calibration of an acoustic logging system. The calibration is "in situ" in that it is performed within the borehole at each firing of a transducer of the acoustic logging system. There is no need to move the logging tool to an interval of free pipe, nor is there a need to calibrate the transducer in a surface calibration fixture. The calibration is "continuous" in that it is made at each firing of the acoustic transducer. The calibration is "automatic" in that no external command, such as a signal from the surface, is needed to initiate the calibration procedure. Finally, the calibration is performed at each measure point in "real-time" and requires no post logging processing. Although applicable to other embodiments, the invention will be disclosed as an acoustic impedance calibration for the transducer of the previously mentioned Ultrasonic Radial Scanner acoustic logging system disclosed in U.S. Patent Application Publication No. US 2006/0067162 A1, which is here in entered into this disclosure by reference.

As stated above, the ultrasonic transducer is calibrated in situ, continuously, automatically, and in real-time at each depth interval and azimuthal scan angle as the ultrasonic scanning logging tool is conveyed within borehole casing. A specific depth and azimuthal scan angle will hereafter be referred to as a "measure point" for brevity. Stated another way, calibration is obtained using tool response to casing and other borehole environs at each measure point thereby negating the need for free pipe intervals or surface calibration fixtures. Furthermore, no transducer characterization is necessary since acoustic spectrum characteristics are measured by internal casing reflection. By taking the frequency characteristics of the ultrasonic transducer which are present in the internal casing reflection and convolving them with the frequency characteristics of the casing being logged, a model is created with a theoretical acoustic impedance fluid producing a theoretical free pipe signal at each measure point. The measured signal is then compared to the theoretical free pipe signal thereby yielding an accurate, calibrated cement acoustic impedance value for at each measure point. The only model used is in the theoretical calculation of spectrum characteristics of free pipe.

BRIEF DESCRIPTION OF THE DRAWINGS

So that the manner in which the above recited features, advantages and objects the present invention are obtained and can be understood in detail, more particular description of the invention, briefly summarized above, may be had by reference to the embodiments thereof which are illustrated in the appended drawings.

DETAILED DESCRIPTION OF THE PREFERRED EMBODIMENTS

Methods and apparatus for in situ, automatic, continuous and real-time acoustic impedance calibration of an acoustic logging system transducer will be disclosed in an Ultrasonic Radial Scanner acoustic logging system embodiment. It is again emphasized that the methodology of the invention is applicable to essentially any acoustic transducer operating in a cased well borehole environment.

An overview of the Ultrasonic Radial Scanner acoustic logging tool is first presented. Next, details of the calibration methods are disclosed in detail. Finally, results obtained with the invention embodied as an Ultrasonic Radial Scanner logging system are discussed.

Overview of the System

Figure 1:
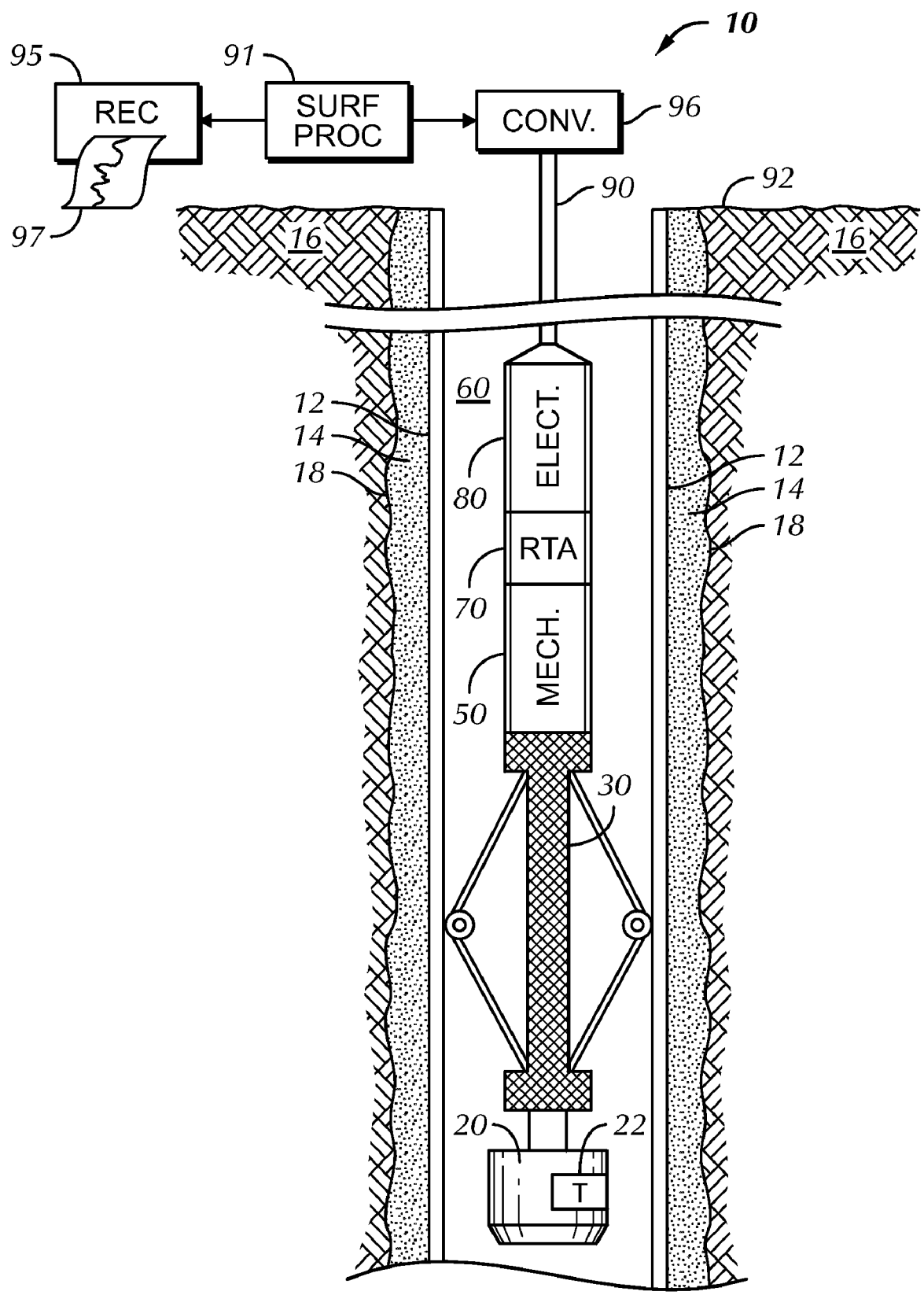
FIG. 1 illustrates the invention embodied in a Ultrasonic Radial Scanner logging system operating in a well borehole environment.

FIG. 1 illustrates the major elements of the Ultrasonic Radial Scanner logging system operating in a well borehole environment. The downhole apparatus or "tool", identified as a whole by the numeral 10, is suspended at a down hole end of a data conduit 90 in a well borehole defined by walls 18 and penetrating earth formation 16. The upper end of the data conduit 90 is operationally attached conveyance means 96. The borehole is cased with a tubular casing 12, and the annulus defined by the borehole wall 18 and the outer surface of the casing 12 is filled with a grout 14 such as cement. The casing is filled with a fluid 60. A surface processor 91 is used for data processing at the surface, and is shown operationally connected to the conveyance means 96. A recording means 95 cooperates with the surface processor 91 to generate one or more "logs" 97 of parameters of interest measured as a function depth of the tool 10 within the borehole. For purposes of further discussion, it will be assumed that the data conduit is a wireline cable comprising one or more conductors, and the conveyance means 96 is a logging system draw works comprising a motor, a winch, and tool depth measuring apparatus.

Again referring to FIG. 1, the lower end of the tool 10 is terminated by a scanning head 20 comprising an ultrasonic scanning transducer 22 of known frequency response. The scanning head is rotated about the major axis of the tool 10, and the scanning transducer 22 is activated or "fired" in sequential bursts at a given "measure point" as the scanning head 20 is rotated and simultaneously conveyed within the borehole. The scanning transducer 22 is disposed such that emitted acoustic energy bursts are directed essentially perpendicular to the major axis of the borehole. The transducer is fired at azimuthal positions, which are preferably sequentially at equal time intervals and burst widths, about 72 times per revolution of the scanning head 20. Response signals, resulting from each emitted acoustic energy burst interacting with the borehole environs at each measure point, is detected by the scanning transducer 22 and subsequently processed.

Still referring to FIG. 1, the scanning head 20 is operationally attached to a centralizer subassembly 30, which positions the tool 10 essentially in the center of the borehole. The centralizer subassembly 30 is operationally attached to a mechanical subassembly 50 as is illustrated in FIG. 1. The mechanical sub section comprises a motor which rotates the scanning head 20, a slip ring assembly to conduct electrical signals to and from the scanning transducer 22 within the scanning head 20, and a pressure balance system that is used to maintain certain elements of the tool 10 at borehole pressure. A reference transducer assembly 70 is disposed above the mechanical subassembly 50. The reference transducer assembly measures the slowness and the acoustic impedance of the borehole fluid 60.

Again referring to FIG. 1, the upper end of the tool 10 is terminated with an electronics subassembly 80. The electronics subassembly comprises electronics for controlling the various elements of the tool 10, a control processor which directs the operation of the tool, power supplies to operate electrical elements of the tool, a down hole telemetry element for transmitting data to and receiving data from the surface of the earth, and a data processor which processes response signals from the transducer 22 to calibrate the transducer (as outlined above) and to obtain one or more parameters of interest.

A detailed description of Ultrasonic Radial Scanner acoustic logging system, as well as alternate embodiments of the system, are disclosed in previously referenced in U.S. Patent Application Publication No. US 2006/0067162 A1.

Data Processing

The steps in processing responses of the transducer 22 at each measure point are summarized as follows:

(1) A "composite" transducer response signal is measured at each measure point. The composite response signal is not calibrated and includes casing reverberations.

(2) The casing reverberations are removed by time back mute filtering the composite response signal leaving an internal casing reflection component. An ultrasonic transducer transfer function TRT is determined from the internal casing reflection.

(3) A casing transfer function (TR) is determined.

(4) The ultrasonic transducer transfer function (TRT) is convolved with the casing transfer function (TR) to obtain a total transfer function (TTF).

(5) The total transfer function (TTF) is inverse Fourier transformed producing a theoretical free pipe time signal that is commensurate with the casing that the tool "sees" at a specific measure point.

(6) The composite response signal is compared with the theoretical free pipe signal to obtain a measure of acoustic impedance of cement or any other material behind the casing.

These steps are repeated at every azimuthal measure point and at every axial depth position as the rotating transducer in logging tool is conveyed along the borehole.

Figure 2A:
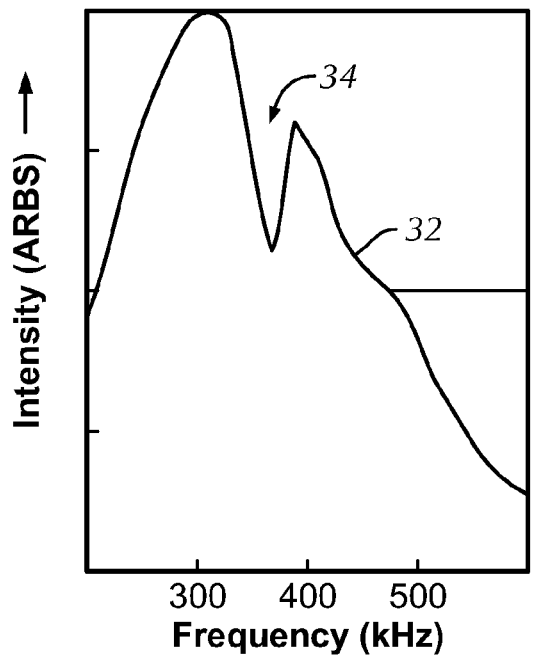
FIG. 2a illustrates a transducer composite response signal in the frequency domain.
Figure 2B:
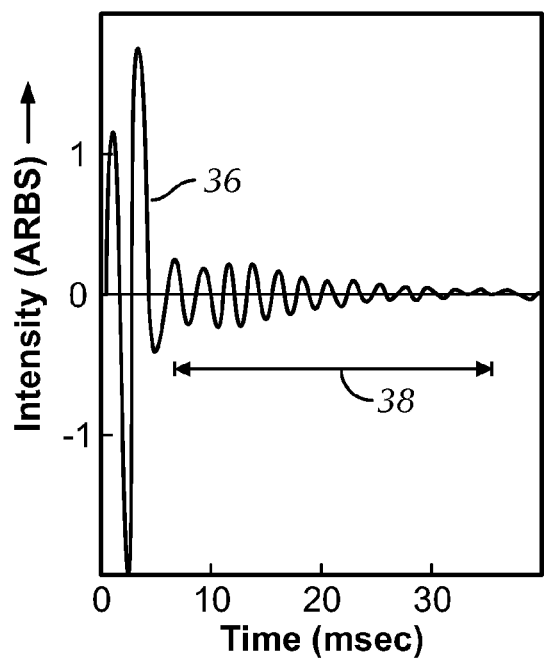
FIG. 2b illustrates the same composite response signal in the time domain.

The measured acoustic impedance of the cement or any material in the casing-borehole annulus, as well as the calibration techniques set forth in this disclosure, are related to the area of the envelope of the reflections in the measured composite response signal. A typical transducer composite response signal measured with the acoustic transducer 22 is shown in FIGS. 2a and 2b. FIG. 2a is the composite response signal in the frequency domain, and is represented by area defined curve 32 in a plot of intensity of returned acoustic energy in arbitrary units as a function of frequency in kiloHertz (kHz). The excursion 34 of the curve 32 corresponds to casing reverberations with cement or any material behind casing. FIG. 2b is the same composite response signal in the time domain with curve 36 representing intensity of returned acoustic energy in arbitrary units as a function of time in microseconds ($\mu$sec). Oscillations in the curve 36 over the time interval 38 represent casing reverberations in the time domain. Composite response signals shown in FIGS. 2a and 2b are not calibrated.

Figure 3A:
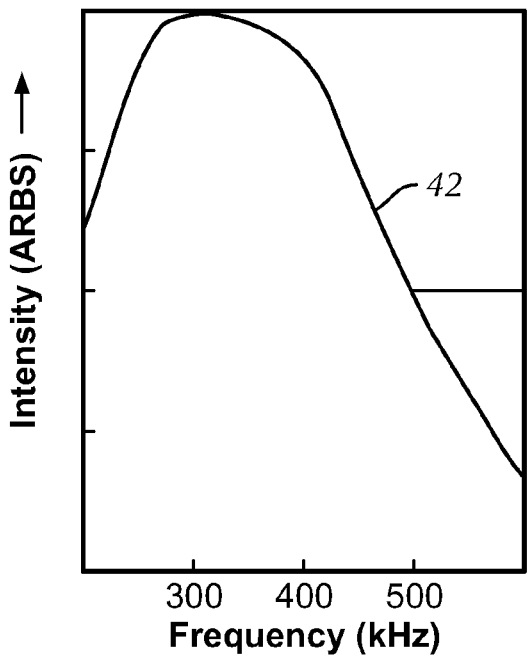
FIG. 3a illustrates a filtered composite response signal in the frequency domain.
Figure 3B:
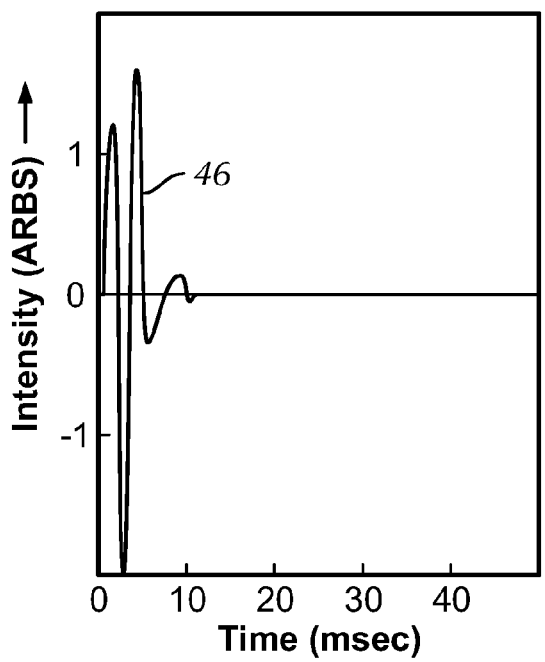
FIG. 3b illustrates the same filtered composite response signal in the time domain.

FIGS. 3a and 3b show the measured composite response signal shown in FIGS. 2a and 2b, respectively, with the casing reverberations removed by filtering preferably in the time domain. Time filtering is known in the formation data processing art. More specifically, time filtering is widely used in calculations of formation sound velocities. The scales and units of the ordinates and abscissas are the same as those shown in corresponding FIGS. 2a and 2b. The signal shown in FIG. 3a is the filtered composite response signal in the frequency domain and is represented by the area defined by curve 42. Note that the excursion 34 in FIG. 2a of the corresponding non-filtered composite response signal is missing. The signal shown in FIG. 3b is the filtered composite response signal in the time domain and is represented by the curve 46. Note also that the oscillations 36 in FIG. 2b representing casing reverberations are missing. The filtered signals represented by curves 3a and 3b contain only an internal casing reflection component. The previously mentioned ultrasonic transducer transfer function TRT is determined from the internal casing reflection. The internal casing reflection provides the frequency characteristics of the transducer since the inside or inner surface of the casing can be treated as an almost perfect reflector or acoustic mirror. No transducer characterization is needed since transducer spectral characteristics are measured by internal casing reflections.

The casing transfer function TR is calculated using a two-port acoustic transmission line section model. This model is disclosed in detail in the publication "A Calculation Scheme for the Optimum Design of Ultrasonic Transducers", S. J. H. vanKervel and J. M. Thijssen, ULTRASONICS, May, 1983, Pages 134-140, which is herein entered into this disclosure by reference. Following the general scheme disclosed in the entered reference, a casing matrix [C] is represented by the general equation $$\begin{bmatrix} V_2 \\ I_2 \end{bmatrix} = (C) \begin{bmatrix} V_1 \\ I_1 \end{bmatrix} \tag{1}$$

where

V1 and V2 represent pressures at the input and output ports, respectively, of the two-port acoustic transmission line model, and I1 and I2 represent particle velocities at the input and output ports, respectively of the two-port acoustic transmission line model.

The boundary conditions are:

$$V_1 = V_1^+ + V_1^- \tag{2}$$
$$I_1 = \frac{V_1^+ - V_1^-}{Z_{in}}$$

where $Z_{in}$ is the measured acoustic impedance of fluid within the borehole by the mud chamber. Likewise $$V_2 = V_2^+ \tag{3}$$
$$I_2 = \frac{V_2^+}{Z_{out}}$$

where Zout is the assumed acoustic impedance of the fluid behind free pipe. The plus sign indicates waves traveling in the positive direction from transducer to casing while the minus sign indicates waves traveling in the negative direction towards the transducer. Notice that equation (3) assumes infinite fluid behind casing or that casing perfectly free. This is a valid assumption since no reflector behind water should be present in the calibration process. The casing matrix [C] may be expressed as $$[C] = \begin{bmatrix} A & B \\ C & D \end{bmatrix} \tag{4}$$

and $$A = \cosh(\xi T_{hc}) \tag{5}$$
$$B = -Z_{cas}\sinh(\xi T_{hc})$$
$$C = -\frac{1}{Z_{cas}}\cosh(\xi T_{hc})$$
$$D = \cosh(\xi T_{hc})$$

where Zcas and Thc are the casing acoustic impedance (known constant) and thickness (measured by the frequency of the reverberations of the casing), respectively. The term $\zeta$ is a propagation constant and it is given by ($\alpha$+j$\beta$Thc), where $\alpha$ is a known attenuation constant of the casing and $\beta$ is referred to as the delay constant and is known.

The resulting reflected transfer function of the casing is:

$$TR = \frac{V_1^-}{V_1^+}, \tag{6}$$

or

-continued $$TR = \frac{AZ_{in} - DZ_{out} - CZ_{in}Z_{out} + B}{CZ_{in}Z_{out} - DZ_{out} - AZ_{in} + B}$$

where Zin is the acoustic impedance of the fluid and is measured continuously using apparatus and methods disclosed in previously referenced U.S. Patent Application Publication No. US 2006/0067162 A1, and Zout is set to a water value of 1.5 Mrayls. All terms on the right hand side of equation (6) are measured, estimated or are known constants. Equation (6) can, therefore, be solved for the casing transfer function TR.

Figure 4A:
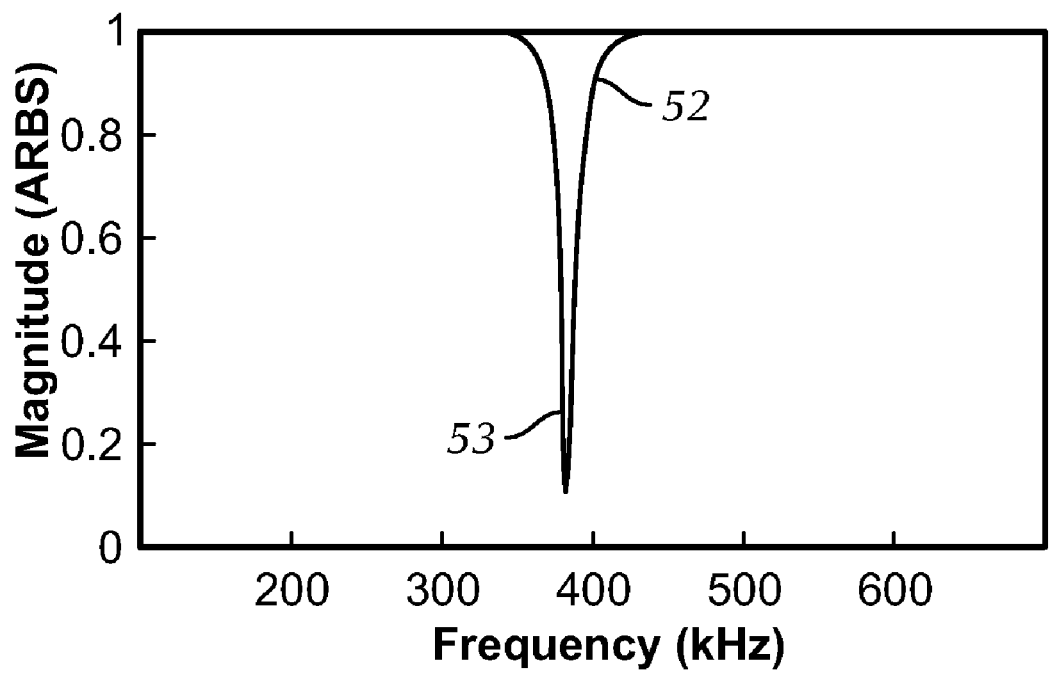
FIG. 4a illustrates magnitude of a casing transfer function as a function of phase.
Figure 4B:
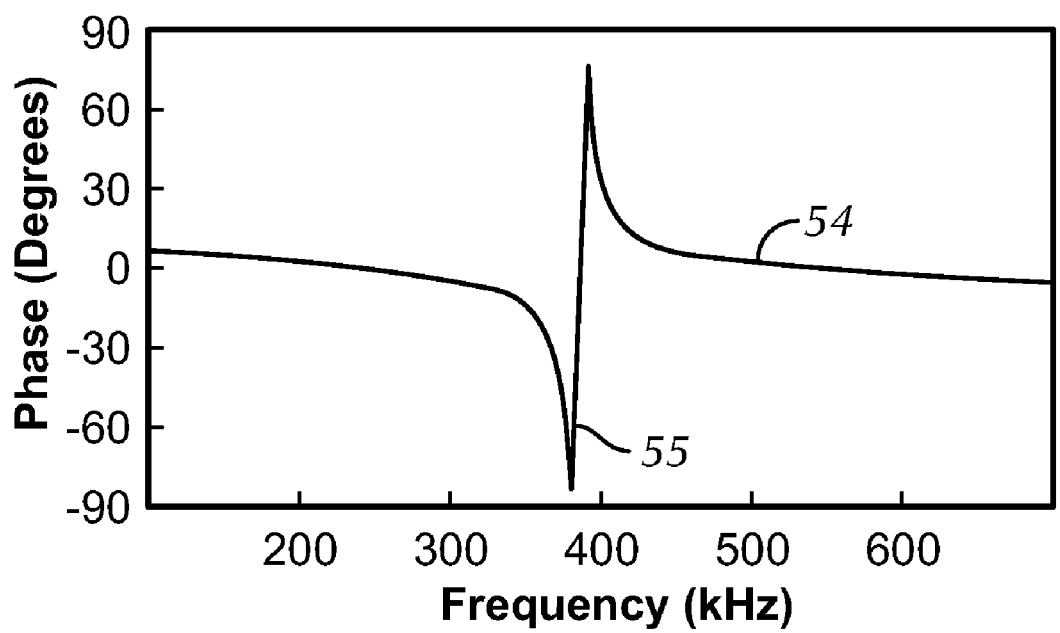
FIG. 4b illustrates magnitude of the same casing transfer function as a function of frequency.

The casing transfer function TR is illustrated in FIG. 4a by curve 52 in magnitude (in arbitrary units) as a function of frequency (in kHz). The casing transfer function TR is illustrated in FIG. 4b by curve 54 in phase (in degrees) as a function of frequency (in kHz). For this particular example, the resonance of the casing is near 380 kHz as illustrated at 53 and 55 in FIGS. 4a and 4b, respectively. These resonances are representative of a casing with a thickness of about 0.33 inches.

Figure 5A:
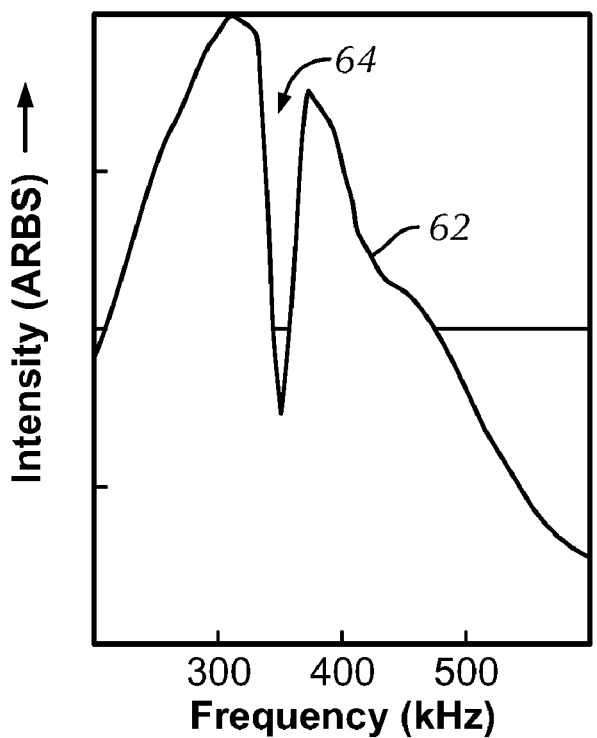
FIG. 5a illustrates a total transfer function in the frequency domain.
Figure 5B:
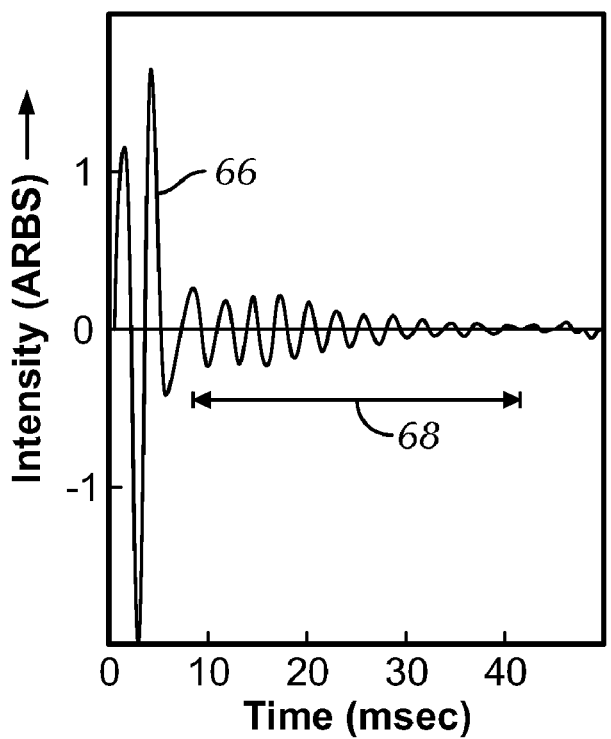
FIG. 5b illustrates the same total transfer function in the time domain.

The casing reflected transfer function TR computed from equation (6) is convolved (in the frequency domain) with the ultrasonic transducer transfer function TRT of FIG. 3a. The resulting total transfer function TTR after convolution is inverse Fourier transformed and is illustrated in FIGS. 5a and 5b. The scales and units of the ordinates and abscissas are the same as in corresponding illustrations FIGS. 2a and 2b and FIGS. 3a and 3b. FIG. 5a is the total transfer function in the frequency domain and is represented by area defined curve 62 in a plot of intensity of acoustic energy as a function of frequency. The excursion 64 of the curve 62 corresponds to free casing reverberations. FIG. 5b is the same total transfer function in the time domain with curve 66 representing intensity of returned acoustic energy as a function of time. Oscillations in the curve 66 over the time interval 68 represent free casing reverberations in the time domain. Note that the excursion 64 is deeper than the corresponding excursion 34 in the measured composite response signal shown in FIG. 2a. Note also that the free pipe reverberations 68 are more intense than the corresponding reverberations 38 in the measured composite response signal shown in FIG. 2b.

The resulting free pipe characteristics yield a theoretical free pipe time signal that can be used to calibrated the measured composite acoustic impedance of the cement at any azimuthal or axial measure point during a logging operation. This free pipe signal contains the true ultrasonic transducer spectrum in situ. No modeling of this signal is necessary. In addition, the impedance of any fluid behind the casing does not need to be known. Any reasonable acoustic impedance value can be entered and the calibration is automatically referred to that particular value, although 1.5 Mrayls is a typical number for water.

The above disclosed calculations can be performed in a processor disposed within the electronics section 80 of the logging tool 10. Alternately, "raw" data can be telemetered to the surface 92 of the earth and performed in the surface processor 91.

RESULTS

The measured acoustic impedance Z of cement or any other material in the casing-borehole annulus is related to the area of the envelope of reflections of the casing by comparing these casing reflections to casing reflections in free pipe. This technique is disclosed in detail in the publication "Ultrasonic Cement Bond Evaluation", R. M. Havira, Society of Profession Well Log Analyst 23d Annual Logging Symposium, Jul. 6-9, 1982, which is here in entered into this disclosure by reference. In addition to casing dimensions, additional parameters affect the area of the envelope of reflections and thus the determined value of acoustic impedance Z. These additional parameters and their relationship to the determined value of Z are discussed in the Havira reference and also the previously referenced in U.S. Patent Application Publication No. US 2006/0067162 A1.

Recall that the referenced Ultrasonic Radial Scanner logging system disclosed in U.S. Patent Application Publication No. US 2006/0067162 A1 measures acoustic impedance of material within the casing-borehole annulus at measure points defined by an azimuthal sector "i" and an axial depth segment "x" within the borehole. Using the methodology of this disclosure in combination with the Ultrasonic Radial Scanner logging system yields measures of acoustic impedance Z(i,x) that are calibrated for in situ, continuous, automatic and real-time. Values of Z(i,x) can be used to generate a two dimensional "map" of acoustic impedance as a function of i and x. This map is preferably computed in the surface processor 91 and input to a recorder 95 that produces a "log" 97 of the two dimensional map of Z(i,x).

While the foregoing disclosure is directed toward the preferred embodiments of the invention, the scope of the invention is defined by the claims, which follow.

What is claimed is:

1. A method for using an acoustic logging system comprising an acoustic transducer and a processor cooperating with said acoustic transducer to obtain a calibrated measure of acoustic impedance in a cased borehole, the method comprising:
   at a measure point, measuring a composite response signal with said transducer;
   at said measure point, determining a theoretical free pipe response of said transducer with said processor by:
      determining an ultrasonic transducer transfer function from said composite response function after filtering to remove casing reverberations;
      determining a casing transfer function;
      convolving said ultrasonic transfer function with said casing transfer function to obtain a total transfer function; and
      determining said theoretical free pipe response by inverse Fourier transforming said total transfer function; and
   combining said composite response signal with said theoretical free pipe response signal to obtain said calibrated measure of acoustic impedance.

2. The method of claim 1 wherein said casing transfer function is determined according to the equation:

$$TR = \frac{AZ_{in} - DZ_{out} - CZ_{in}Z_{out} + B}{CZ_{in}Z_{out} - DZ_{out} - AZ_{in} + B}$$

where
   TR=the casing transfer function,
   $Z_{in}$=the acoustic impedance of fluid within the casing and is measured,
   $Z_{out}$=the acoustic impedance of fluid outside of the casing and is estimated, and
   A, B, C and D are terms computed from known or measured parameters.

3. The method of claim 2 wherein said terms A, B, C and D are determined according to the equations:

$$A = \cosh(\xi T_{hc})$$
$$B = -Z_{cas}\sinh(\xi T_{hc})$$
$$C = -\frac{1}{Z_{cas}}\cosh(\xi T_{hc})$$
$$D = \cosh(\xi T_{hc})$$

where
$Z_{cas}$=the casing acoustic impedance which is a known constant,
$T_{hc}$=casing thickness determined by from frequency of the reverberations of the casing, and
$\zeta=(\alpha+j\beta T_{hc})$ is a propagation constant,
where
$\alpha$=a known attenuation constant of the casing
j=a normalization constant, and
$\beta$=the delay constant and is known.

4. The method of claim 1 further comprising:
obtaining a plurality of said calibrated measure of acoustic impedance at a measure points located axially along and azimuthally around said borehole;
with said plurality of said calibrated measures of acoustic impedance, generating a two dimensional map of acoustic impedance.

5. A method for using an acoustic logging system comprising an acoustic transducer and a processor cooperating with said acoustic transducer to determine a theoretical value of free pipe in a cased borehole, the method comprising:
at a measure point, measuring a composite response signal with said transducer disposed within said borehole; and
with said processor:
determining an ultrasonic transducer transfer function from said composite response function after filtering to remove casing reverberations;
determining a casing transfer function;
convolving said ultrasonic transfer function with said casing transfer function to obtain a total transfer function; and
determining said theoretical free pipe response by inverse Fourier transforming said total transfer function.

6. The method of claim 5 wherein said casing transfer function is determined according to the equation:

$$TR = \frac{AZ_{in} - DZ_{out} - CZ_{in}Z_{out} + B}{CZ_{in}Z_{out} - DZ_{out} - AZ_{in} + B}$$

where
TR=the casing transfer function,
$Z_{in}$=the acoustic impedance of fluid within the casing and is measured,
$Z_{out}$=the acoustic impedance of fluid outside of the casing and is estimated, and
A, B, C and D are terms computed from known or measured parameters.

7. The method of claim 6 wherein said terms A, B, C and D are determined according to the equations:

$$A = \cosh(\xi T_{hc})$$
$$B = -Z_{cas}\sinh(\xi T_{hc})$$
$$C = -\frac{1}{Z_{cas}}\cosh(\xi T_{hc})$$
$$D = \cosh(\xi T_{hc})$$

where
$Z_{cas}$=the casing acoustic impedance which is a known constant,
$T_{hc}$=casing thickness determined by from frequency of the reverberations of the casing, and
$\zeta=(\alpha+j\beta T_{hc})$ is a propagation constant,
where
$\alpha$=a known attenuation constant of the casing
j=a normalization constant, and
$\beta$=the delay constant and is known.

8. An acoustic logging system comprising:
an acoustic transducer configured to measure a composite response signal at a plurality of measure points in a borehole; and
a processor cooperating with the acoustic transducer, wherein the processor is:
configured and programmed to receive the measured composite response signal from the transducer;
programmed to compute a theoretical free pipe response of the transducer; and
programmed to combine the measured composite response signal and the theoretical free pipe response of the transducer to obtain a calibrated measure of acoustic impedance;
wherein the processor is programmed to compute the theoretical free pipe response by:
filtering the measured composite response signal to remove casing reverberations;
computing an ultrasonic transducer transfer function from the filtered composite response function;
computing a casing transfer function;
convolving the ultrasonic transfer function with the casing transfer function to obtain a total transfer function; and
computing the theoretical free pipe response by computing an inverse Fourier transform of the total transfer function.

9. The acoustic logging system of claim 8 wherein the casing transfer function is computed according to the equation:

$$TR = \frac{AZ_{in} - DZ_{out} - CZ_{in}Z_{out} + B}{CZ_{in}Z_{out} - DZ_{out} - AZ_{in} + B}$$

where
TR=the casing transfer function,
$Z_{in}$=the acoustic impedance of fluid within the casing and is measured,
$Z_{out}$=the acoustic impedance of fluid outside of the casing and is estimated, and
A, B, C and D are terms computed from known or measured parameters.

10. The acoustic logging system of claim 9 wherein the terms A, B, C and D are computed according to the equations:

$$A = \cosh(\xi T_{hc})$$

$$B = -Z_{cas}\sinh(\xi T_{hc})$$

$$C = -\frac{1}{Z_{cas}}\cosh(\xi T_{hc})$$

$$D = \cosh(\xi T_{hc})$$

where
$Z_{cas}$=a known, constant casing acoustic impedance,
$T_{hc}$=casing thickness determined from a measured casing reverberation frequency, and
$\zeta=(\alpha+j\beta T_{hc})$, a propagation constant,
where
$\alpha$=a known attenuation constant of the casing
j=a normalization constant, and
$\beta$=a known delay constant.

\* \* \* \* \*